March 16, 1965  G. T. ELIASSEN  3,173,557
CONVEYOR SYSTEM
Filed Oct. 5, 1962  7 Sheets-Sheet 1

INVENTOR.
Gunnar Thane Eliassen
BY
Edmund A. Thomson
his ATTORNEY

March 16, 1965 G. T. ELIASSEN 3,173,557
CONVEYOR SYSTEM
Filed Oct. 5, 1962 7 Sheets-Sheet 4

INVENTOR.
Gunnar Thune Eliassen
BY
Edmund A. Fernandez
his ATTORNEY

March 16, 1965   G. T. ELIASSEN   3,173,557
CONVEYOR SYSTEM

Filed Oct. 5, 1962   7 Sheets-Sheet 5

INVENTOR..
Gunnar Thue Eliassen
BY Edmund A. [illegible]
his ATTORNEY

March 16, 1965 G. T. ELIASSEN 3,173,557
CONVEYOR SYSTEM
Filed Oct. 5, 1962 7 Sheets-Sheet 6

INVENTOR.
Gunnar Thune Eliassen
BY Edmund A. ...
his ATTORNEY

United States Patent Office 3,173,557
Patented Mar. 16, 1965

3,173,557
CONVEYOR SYSTEM
Gunnar Thure Eliassen, Partille, Sweden, assignor to Aktiebolaget Electrolux, Stockholm, Sweden, a corporation of Sweden
Filed Oct. 5, 1962, Ser. No. 228,522
Claims priority, application Sweden, Feb. 16, 1962, 1,722/62
13 Claims. (Cl. 214—16)

My invention relates to a conveyor system for sorting articles.

An object of my invention is to provide an improved transfer or switching unit of simplified construction for transferring articles from a chain conveyor to a roller conveyor.

Another object of my invention is to provide an improved transfer or switching unit of simplified construction for transferring articles from a roller conveyor to a chain conveyor.

A further object of my invention is to provide an improved transfer or switching unit for transferring articles from a roller conveyor to a chain conveyor in which the articles are always in a stable position when they are being transferred from one conveyor to the other.

A still further object of my invention is to provide an improved conveyor system for sorting articles positioned on an article receiving conveyor and transferring the sorted articles onto a number of article receiving paths or stations. I accomplish this by providing a control unit which is driven in synchronism with an article receiving conveyor and stops each article at a first zone of the conveyor and initiates movement of each article from the first zone to any one of a number of transfer zones on the conveyor which are at different distances from the first zone and automatically removes the article from the selected transfer zone on the conveyor to an article receiving station or path.

Further objects and advantages of my invention will become apparent as the following description proceeds, and the features of novelty which characterize my invention will be pointed out with particularity in the claims annexed to and forming a part of this specification.

Figure 1:
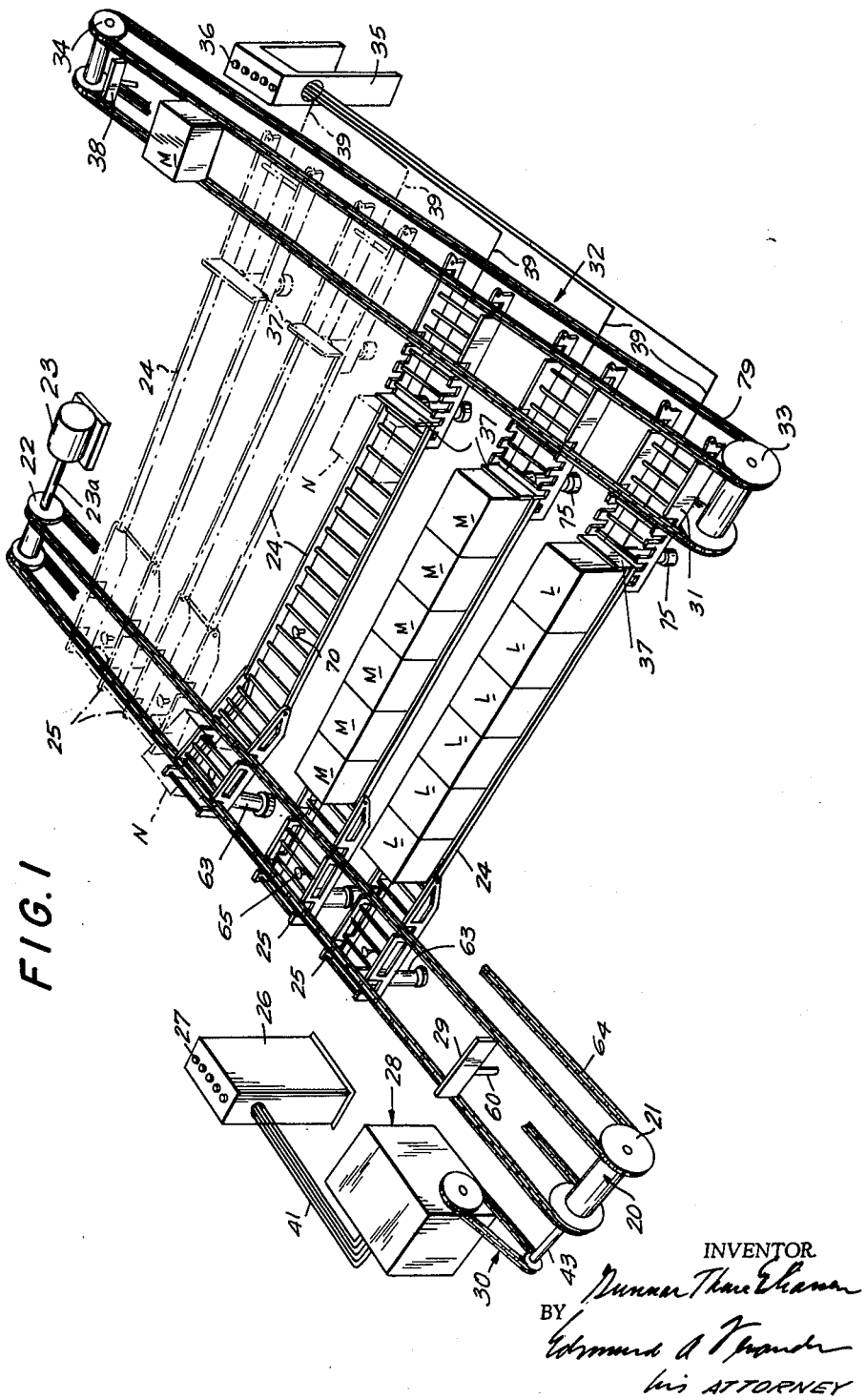
Figure 2:
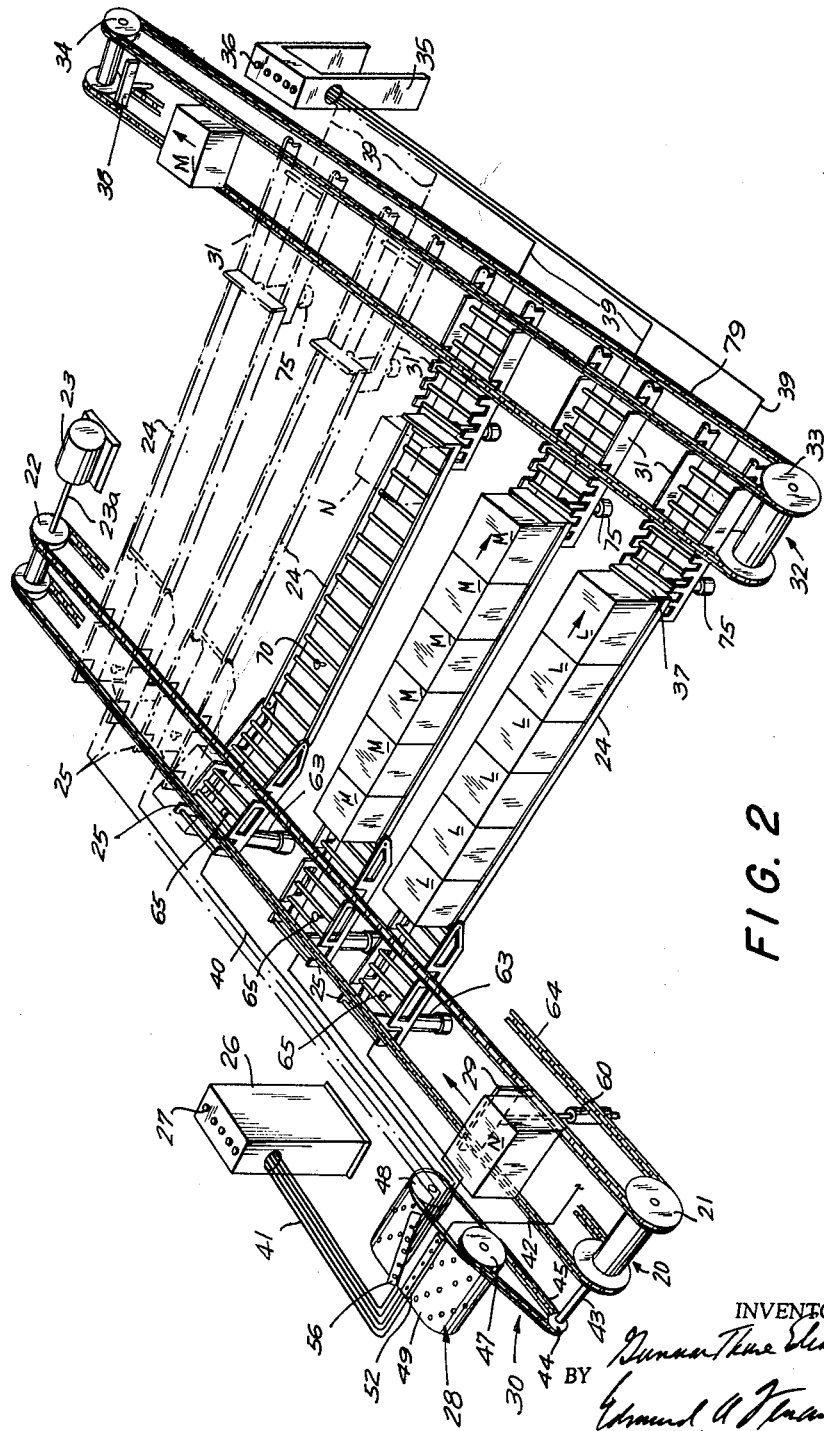
Figure 3:
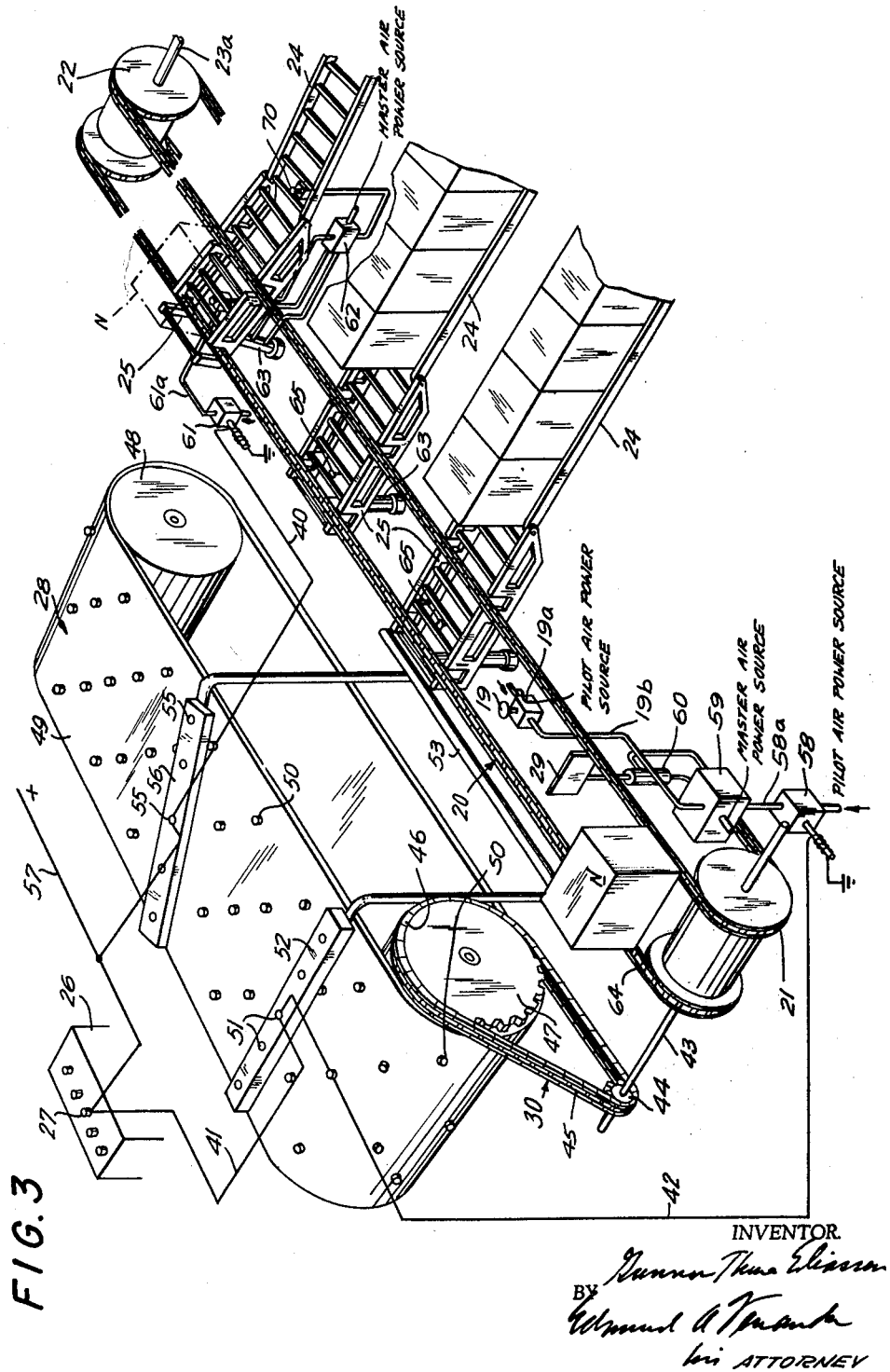
Figure 4:
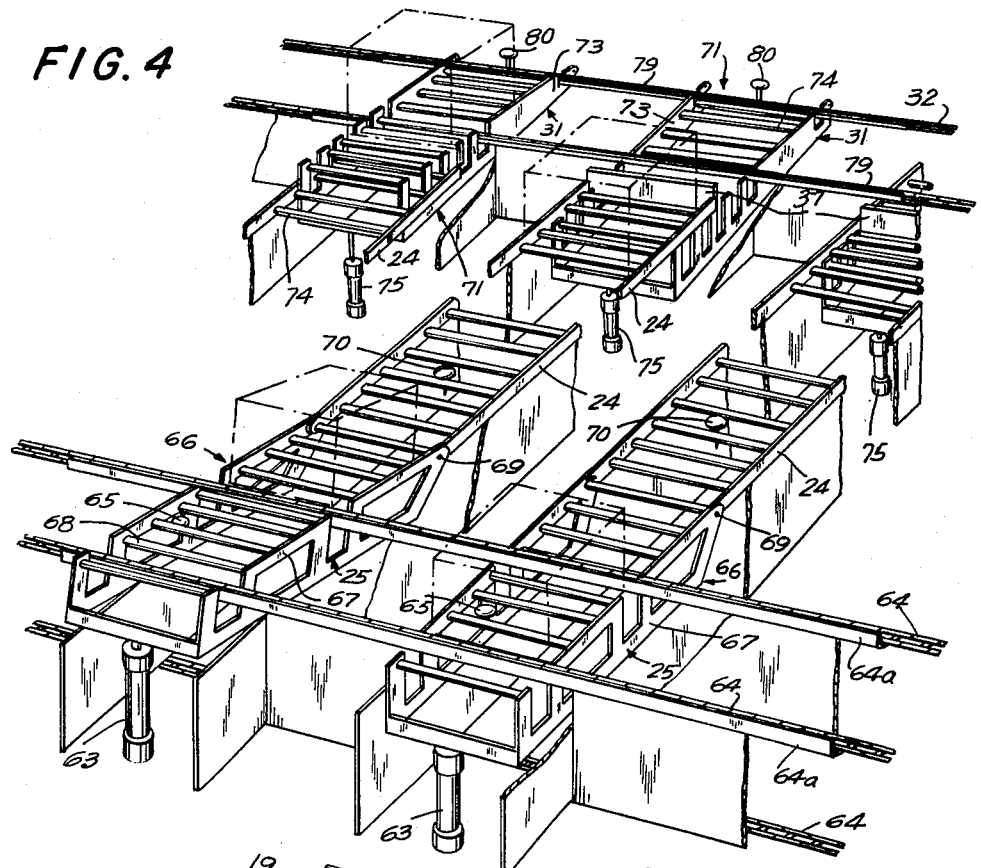
Figure 4A:
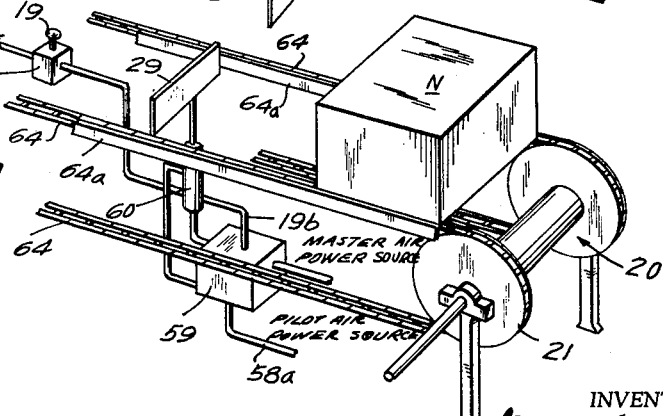
Figure 5:
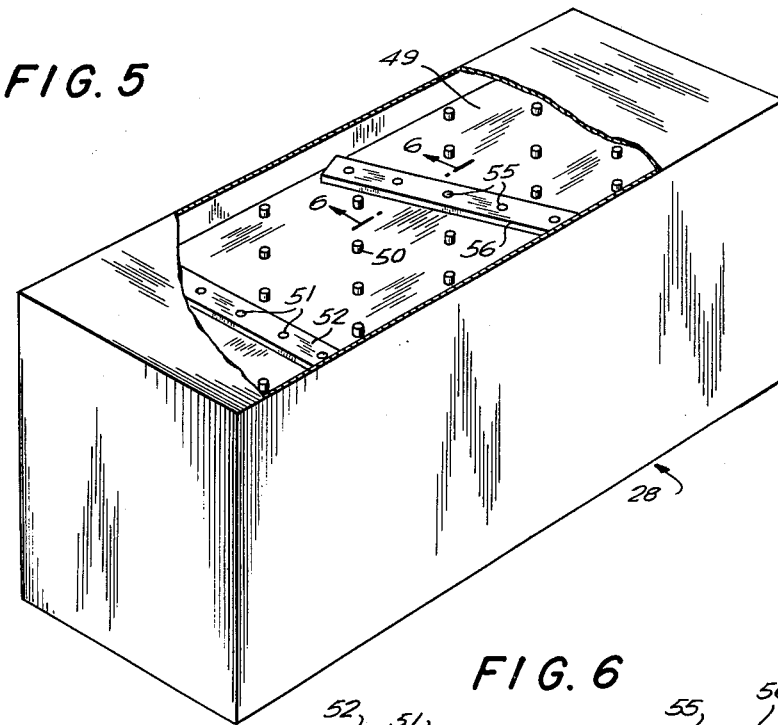
Figure 6:
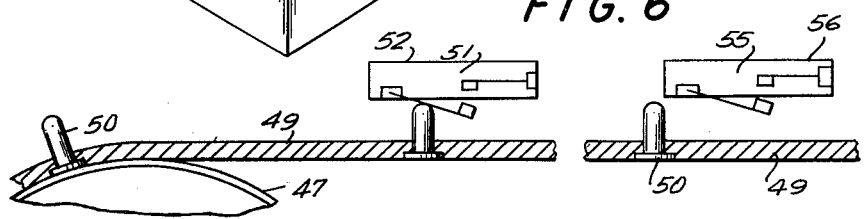
Figure 7:
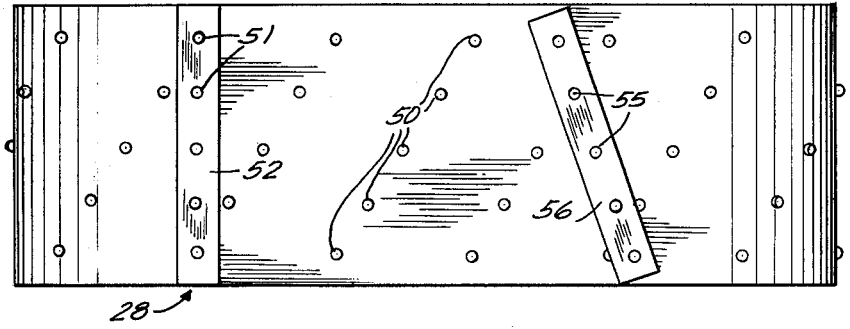
Figure 8:
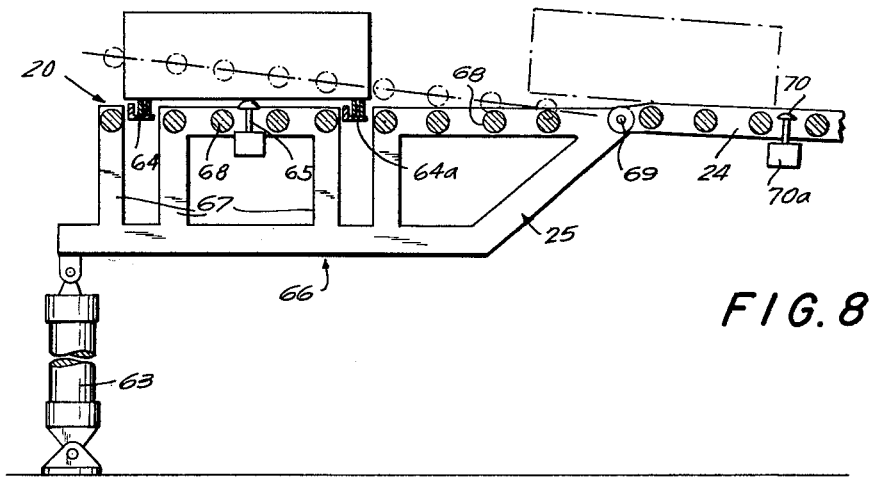
Figure 9:
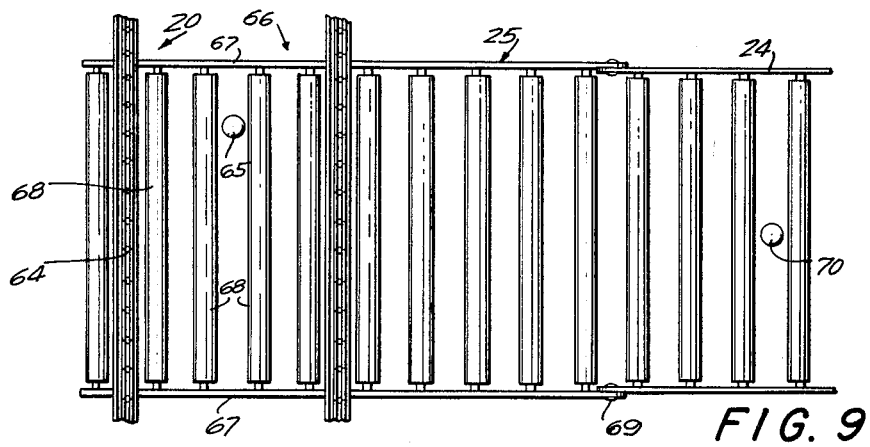
Figure 10:
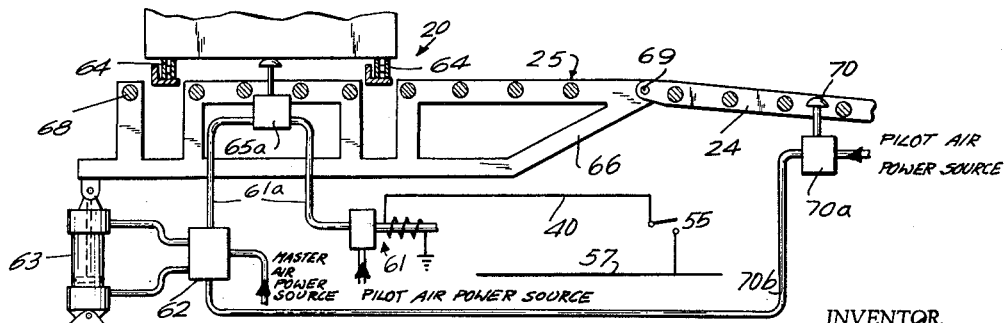
Figure 11:
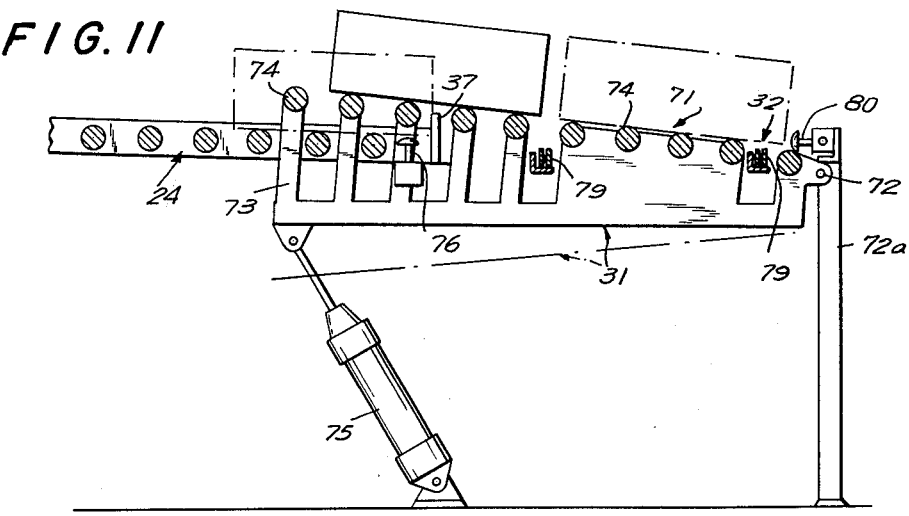
Figure 12:
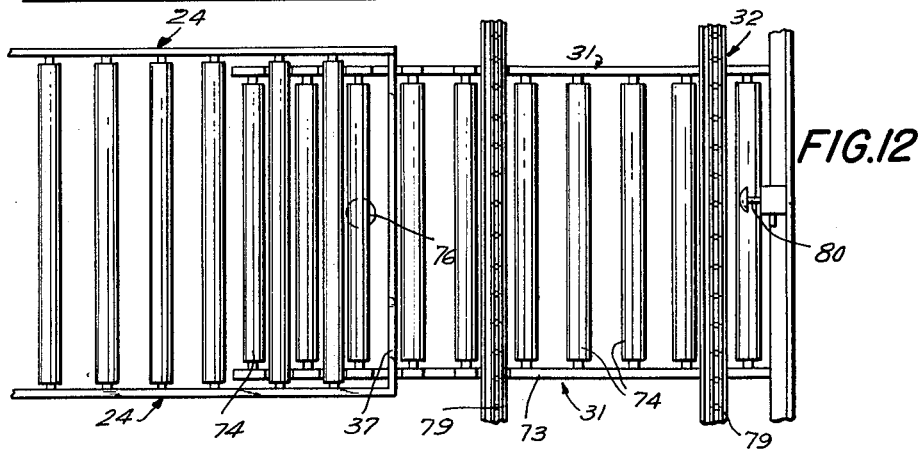
Figure 13:
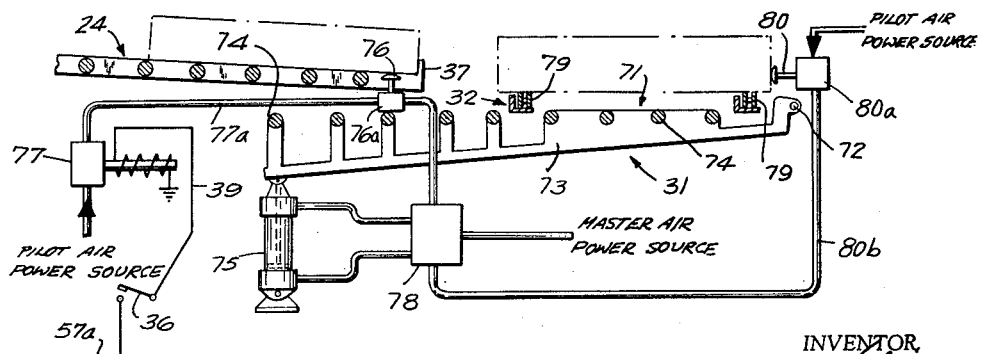

In the drawing, FIG. 1 is a perspective view diagrammatically illustrating an embodiment of my invention for storing and sorting articles; FIG. 2 is a view similar to FIG. 1 and diagrammatically illustrates certain control features more clearly; FIG. 3 is an enlarged fragmentary view of parts shown in FIGS. 1 and 2 and diagrammatically illustrates further control features; FIGS. 4 and 4a are enlarged fragmentary views of parts shown diagrammatically in FIGS. 1 to 3 and illustrate one practical form the conveyors and storage paths or lines may take; FIG. 5 is an enlarged fragmentary view, partly broken away, of parts shown in FIG. 1 and like those illustrated in FIGS. 2 and 3; FIG. 6 is a fragmentary sectional view, partly broken away, taken at line 6—6 of FIG. 5; FIG. 7 is a top view of parts shown in part in FIG. 5; FIG. 8 is a side elevation of parts shown in FIG. 4; FIG. 9 is a top plan view of the parts illustrated in FIG. 8; FIG. 10 diagrammatically illustrates the parts shown in FIG. 8 and additional control features; FIG. 11 is a side elevation of parts shown in FIG. 4; FIG. 12 is a plan view of the parts illustrated in FIG. 11; and FIG. 13 diagrammatically illustrates the parts shown in FIG. 11 and additional control features.

In FIGS. 1 and 2 I have diagrammatically illustrated apparatus embodying my invention which includes an endless article receiving conveyor 20 operating over end rollers 21 and 22 which may be driven by an electric motor 23 having a shaft 23a arranged to drive the end roller 22. Articles, such as boxes, pallets or the like, for example, which are positioned on the receiving conveyor 20 in any suitable manner are selectively transferred therefrom by transfer or switching units 25 to storage paths or lines 24, as will be described more fully hereinafter. When a variety of articles are positioned on the articles receiving conveyor 20, for example, the switching units 25 may be operated to transfer to each of the storage paths 24 articles which are of the same kind or generally similar to one another. Any number of storage paths 24, which are transverse to the receiving conveyor 20, may be provided, and in the embodiment illustrated five such paths are shown. Each article is automatically transferred from the article receiving conveyor 20 to a selected storage path 24 by depressing on a control panel 26 a particular operating member 27 corresponding to the storage path selected, five such operating members being provided on the control panel 26.

The automatic transfer of articles from the receiving conveyor 20 to particular storage paths 24 is effected with the aid of a driven control unit 28 which is driven in synchronism with the receiving conveyor 20 and actuated through speed reduction mechanism 30 from a shaft 43 of end roller 21 of the receiving conveyor. The driven control unit 28 exercises control over a stop 29 which is supported in the manner shown in FIG. 3 and can be moved into and out of the path of movement of articles on the receiving conveyor 20 from the end roller 21 toward the opposite end roller 22, as will be explained hereinafter.

The articles can be selectively transfered by transfer or switching units 31 from the storage paths 24 to an endless delivery conveyor 32 operating over end rollers 33 and 34 which may be driven by a suitable electric motor (not shown) like the motor 23 for the receiving conveyor 20. Each article is automatically transferred from its storage path 24 to the delivery conveyor 32 by depressing on a control panel 35 a particular operating member 36 corresponding to the storage path selected, five such operating members being provided on the control panel 35. At the vicinity of the delivery conveyor 32 a stop 37 is provided in each storage path 24 which normally is in the path of movement of the articles and limits their movement toward the delivery conveyor 32. When a particular operating member 36 is depressed, one of the transfer or switching units 31 is rendered operable to permit an article to be transferred from its storage path to the delivery conveyor 32, at which time the stop 37 momentarily is rendered ineffective and out of the path of movement of the article immediately adjacent to the delivery conveyor. As seen in FIGS. 1 and 2, the delivery conveyor 32 is provided with a stop 38 at its discharge end.

In FIGS. 1 and 2 it will be seen that articles L are stored on the first storage path 24 nearest to the stop 29 of the receiving conveyor 20 and articles M are stored on the second storage path 24 from the stop 29. An article N on the receiving conveyor 20 is shown positioned in front of the stop 29. As will be explained presently, depressing the operating member 27 corresponding to the third storage path 24 renders the driven control unit 28 operable to effect downward movement of the stop 29 out of the path of movement of the article N adjacent thereto and allows the article to be transported on the conveyor 20 to a zone opposite the third storage path 24, at which time the transfer or switching unit 25 at such zone becomes operable to raise the article from the conveyor 20. From its raised position indicated by dotted lines in FIGS. 1 and 2, the article moves by gravity onto the third storage path 24.

As shown in FIG. 4, the storage paths 24 may slope downward from the receiving conveyor 20 to the delivery conveyor 32 to promote downward gravity movement of the articles toward the stops 37. When the article N, indicated by dotted lines in FIGS. 1 and 2, bears against one of the stops 37, a major portion of its weight is directly over a part of one of the transfer or switching units 31 which is operable to transfer the article to the delivery conveyor 32. With this arrangement, as best shown in FIG. 11, the center of gravity of an article is between the end extremities of the switching unit 31 and will remain in a stable position on the switching unit when it becomes operable to transfer the article from the storage path 24 to the delivery conveyor 32, as will be explained presently.

In FIGS. 1 and 2, I have diagrammatically shown electrical conductors 39 connecting the transfer or switching units 31 and the operating panel 35, each conductor being associated with a different one of the operating members 36. Electrical conductors 40 connect the switching units 25 and the driven control unit 28 which in turn is connected by electrical conductors 41 to the control panel 26, each of the conductors 41 being associated with one of the operating members 27. Also, an electrical conductor 42 connects the driven control unit 28 and mechanism associated with the stop 29 on the receiving conveyor 20, as shown in FIG. 3.

While the different paths of movement for the articles are illustrated in FIG. 1 as being essentially in one plane, it will be understood that the several paths of movement provided for the articles may be disposed in different planes one above another, in which case suitable mechanism can be provided for lifting and raising the articles when this becomes necessary. Also, it will be clear that the storage paths 24 may be located at both sides of the receiving conveyor 20, in which case each transfer or switching unit 25 may be arranged to shift articles to one or the other side of the receiving conveyor 20 depending upon the location of the storage path associated therewith.

As seen in FIG. 3, the speed reduction mechanism 30 for actuating the driven control unit 28 includes an endless chain 45 which travels over a small sprocket wheel 44 fixed to a shaft 43 of end roller 21 and a larger sprocket wheel 46 which drives a roller 47. Hence, the speed reduction mechanism 30 drives the control unit 28 at a speed which is less than that at which the receiving conveyor 20 is driven. The driven control unit includes an endless belt 49 which travels over the end roller 47 and another end roller 48 which have the same diameter. As best seen in FIGS. 5 and 6, the belt 49 is provided with a number of upstanding members or pins 50 which function as movable switch actuating members and are arranged in spaced parallel rows lengthwise of the belt, the number of rows of pins 50 corresponding to the number of storage paths 24 in the system, which, in the embodiment illustrated and being described, is five.

Referring to FIGS. 3, 5 and 6, it will be seen that two groups of five electrical switches 51 and 55 are disposed in the paths of movement of the pins 50 and arranged to be actuated when contacted by one of the pins 50. The switches 51 and 55, which are relatively small and of a type available under the trademark "Microswitch," are mounted in holders 52 and 56 which extend above and transversely of the belt 49 and are supported by upright arms of a frame 53. The switch holder 52 is normal to the travel of the belt 49 from left to right, while the switch holder 56 extends obliquely across the belt. Hence, a particular pin 50 moving from left to right in FIG. 3 will first actuate a switch 51 and thereafter actuate a switch 55.

The pins 50 are displaced lengthwise of the belt 49 with respect to each other and to the switches 51 and 55 so that only one switch can be actuated at a time. The distance between the pins 50 in each row corresponds to the frequency at which the articles travel on the receiving conveyor 20, and the distance between the switches 51 and 55 for each storage path 24 is proportional to the distance between the stop 29 on receiving conveyor 20 and the particular switching unit 25 over which the switch 55 exercises control.

In FIG. 3, I have shown the electrical circuits in which the switches 51 and 55 for the third storage path 24 are connected. It should be understood that the electrical circuits for the other switches 51 and 55 are the same as those for the switches 51 and 55 now to be described. When the operating member 27 for the third storage path 24 is depressed and the switch 51 for the same storage path is closed by a pin 50, an electrical circuit will be completed from a source of electrical energy through a conductor 57, the operating member 27, conductor 41, switch 51 for the third storage path 24, conductor 42 and solenoid operated pilot control valve 58 to ground. The solenoid operated valve 58 forms a part of a pilot air control system 58a for controlling flow of compressed air from a pilot air source to a master control valve 59 which is arranged to supply compressed air from a master air power source either to the space above or below the piston in air cylinder 60. When energized the solenoid operated pilot control valve 58 functions to effect downward movement of the piston in cylinder 60 to which is connected the stop 29, whereby the stop 29 will be moved to a position out of the path of movement of an article on the receiving conveyor 20.

As seen in FIG. 3, the switch 55 for the third storage path 24 is connected to the conductor 57 and also by a conductor 40 and a solenoid operated pilot valve 61 to ground. The solenoid operated valve 61 forms a part of a pilot air control system 61a, as shown in FIG. 10, for controlling flow of compressed air from a pilot air source to a master control valve 62 which is arranged to supply air from a master air power source either to the space above or below the piston in air cylinder 63. Under certain conditions that will be explained presently, solenoid operated pilot control valve 61 when energized functions to effect upward movement of the piston in cylinder 63 which is connected to the transfer or switching unit 25 for the third storage path 24, whereby the switching unit 25 will be moved to its raised position.

Referring to FIGS. 4, 4a and 8 to 10, it will be seen that the storage paths 24 comprise suitable frame structure having stationary rollers in spaced relation. The receiving and delivery conveyors 20 and 32 comprise pairs of spaced apart endless chains 64 and 79, respectively. The end rollers for the chain conveyors comprise spaced sprocket wheels, one pair of which is shown at 21 in FIG. 4a. The portions of the endless chains 64 traveling from right to left in FIGS. 4 and 4a ride in elongated members 64a and extend vertically above such members.

As shown in FIG. 8, a box is supported by the spaced chains 64 of the receiving conveyor 20. Beneath the box and spaced from parts of the transfer or switching unit 25 is located a button 65 which is acted upon by the box and may be referred to as a pneumatic control member. The button 65 forms a part of a button operated pilot control valve 65a connected in the pilot air control system 61a, as shown in FIG. 10. When the solenoid operated pilot valve 61 is energized responsive to closing of its associated switch 55 and the button operated pilot control valve 65a simultaneously is acted upon by the box, the pilot air control system 61a becomes operable to cause the master control valve 62 to function to effect upward movement of the piston in cylinder 63 and raise the switching unit 25 connected thereto.

Referring to FIGS. 4 and 8, each transfer or switching unit 25 comprises a frame 66 having spaced sides 67 in which the opposite ends of rollers 68 are fixed. Each switching unit 25 is pivotally connected at 69 to a different one of the storage paths 24. At its opposite outer end each switching unit 25 is connected to the vertically movable piston of one of the cylinders 63 which is pneumatically operated by compressed air, as previously explained. Portions of the spaced sides 67 are recessed or notched to permit the rollers 68 of the frame 66 to be raised above the chain conveyors 64 to the dotted line position shown in FIG. 8. In such raised position of the frame 66, the box will travel by gravity over the rollers 68 onto the rollers defining the storage path 24. At the article receiving end of each storage path 24 is provided a button 70 which is acted upon by an article transferred to the storage path 24 and may be referred to as a pneumatic control member. The button 70 forms a part of a button operated pilot control valve 70a connected in a pilot air control system 70b, as shown in FIG. 10, for controlling flow of compressed air from a pilot air source to the master control valve 62. When the button operated pilot control valve 70a is acted upon by the box, the pilot air control system 70b becomes operable to cause the master air control valve to function to effect downward movement of the piston in cylinder 63 and lower the switching unit 25 to its solid line position in FIG. 8.

When the article N on the receiving conveyor 20 is to be delivered to the third storage path 24, for example, it advances to the stop 29 which is in its raised or upper position, as shown in FIG. 3. The receiving conveyor 20 and endless belt 49 of the driven control unit 28 are driven continuously. Hence, when the article N moves against the stop 29 and is prevented from traveling on the conveyor, it will slide on the endless chains 64 of the receiving conveyor 20.

When the operating button 27 for the third storage path 24 is manually depressed or actuated automatically in an electrical system employing punch cards, an electrical circuit will be completed for the solenoid operated pilot control valve 58 when a pin 50 in the third row of pins on endless belt 49 closes the electrical switch 51. When this occurs the pilot air control system 58a becomes operable to cause the master air control valve 59 to function to effect downward movement of the piston in cylinder 60 and lower the stop 29 out of the path of movement of the article N. Immediately after the article N travels past the stop 29 it acts upon a button 19 which may be referred to as a pneumatic control member. The button 19 forms a part of a button operated pilot control valve 19a connected in a pilot air control system 19b, as shown in FIG. 4a, for controlling flow of compressed air from a pilot air source to the master control valve 59. When the button operated pilot control valve 19a is acted upon by the box, the pilot air control system 19b becomes operable to cause the master control valve 59 to function to effect upward movement of the piston in cylinder 60 and raise the stop to its solid line position in FIG. 4a.

After the article N passes the stop 29 it moves a definite distance on conveyor 20 toward the transfer or switching unit 25 for the third storage path 24. This movement of the article N on the receiving conveyor 20 is synchronized with the movement of the pin 50 which closed the switch 51, as explained above, and is traveling a definite distance toward the switch 55 for the third storage path 24. When the article N reaches the switching unit 25 for the third storage path 24 and acts upon the button or pneumatic control member 65, the pin 50 which previously closed switch 51 reaches the switch 55 for the third storage path, whereupon the solenoid operated pilot valve 61 will be energized at the same time that the button operated pilot valve 65a is actuated by the article N. Under these conditions, the pilot air control system 61a becomes operable to cause the master air control valve 62 to function to effect upward movement of the piston in cylinder 63 and raise the switching unit 25 for the third storage path 24 about its pivotal connection at 69.

With the switching unit 25 in its raised position, the article N will move downward by gravity over the rollers 68 onto the rollers of the third storage path 24. As explained above, the button or pneumatic control member 70, when acted upon by the article N at the receiving end of the third storage path, will cause the master air control valve 62 to function to effect downward movement of the piston in cylinder 63 to lower the switching unit 25 for the third storage path 24 to the solid line position shown in FIG. 8. An operating member 27 now can be actuated to release another article from the stop 29 and deliver the article to the third storage path 24 or to one of the storage paths beyond it.

By providing storage paths 24 which slope downward from the receiving conveyor 20 to the delivery conveyor 32, the articles transferred from the receiving conveyor 20 to the storage paths will roll by gravity on the latter against the stops 37. Each article resting against a stop 37 can be transferred from a storage path 24 to the delivery conveyor 32 by one of the transfer or switching units 31. As best shown in FIGS. 4 and 11 to 13, each switching unit 31 comprises a frame 71 having spaced sides 73 in which the opposite ends of rollers 74 are fixed. Each switching unit 31 is pivotally connected at 72 to upright members 72a at one side of the delivery conveyor 32. At its opposite outer end each switching unit 31 is connected to the vertically movable piston of a cylinder 75 which is pneumatically operated by a fluid under pressure, such as compressed air, for example. Portions of the spaced sides 73 are recessed or notched to permit the rollers 74 of the frame 71 to be raised above the chain conveyors 79 to the solid line position shown in FIG. 11.

When an article has moved against a stop 37, the article acts upon a button 76 which may be referred to as a pneumatic control member. The button 76 forms a part of a button operated pilot valve 76a connected in a pilot air control system 77a, as shown in FIG. 13. A solenoid operated pilot valve 77, which is also provided in the pilot air control system 77a, is actuated by closing one of the operating members 36 on the control panel 35. As seen in FIG. 13, this completes an electrical circuit from a source of electrical energy through conductor 57a, switch or operating member 36, conductor 39 and solenoid operated pilot valve 77 to ground.

The pilot air control system 77a controls flow of compressed air from a pilot air source through pilot valves 77 and 76a to a master control valve 78 which is arranged to supply compressed air from a master air power source either to the space above or below the piston in cylinder 75. When the solenoid operated pilot valve 77 is energized and button operated pilot valve 76a is actuated, the pilot air control system 77a causes master air control valve 78 to function and effect upward movement of the piston in cylinder 75 to raise the switching unit 31 about its pivotal connection 72 from the dotted line to the solid line position in FIG. 11. The outer end of the switching unit 31 extends beyond the stop 37 for a sufficient distance so that, when the switching unit 31 raises and lifts the article from the storage path 24, the outer end of the unit extends beyond the center of gravity of the article.

When the rollers 74 of the switching unit 31 are at a level above the top edge of the stop 37, the article rolls by gravity over the conveyor chains 79 of the delivery conveyor 32, as indicated in dotted lines in FIGS. 11 and 13. When this occurs the article acts upon a button or pneumatic control member 80. The button 80 forms a part of a button operated pilot control valve 80a connected in a pilot air control system 80b, as shown in FIG. 13, for controlling flow of compressed air from a pilot air source to the master control valve 78. When the button operated pilot control valve 80a is acted upon by the box, the pilot air control system 80b becomes operable to cause the master air control valve 78 to function to effect downward movement of the piston in cylinder 75 and lower the switching unit 31 to the position shown in FIG. 13. When this occurs the next box in the storage path 24 can move against the stop 37.

While I have shown and described a single embodiment of my invention, it will be apparent to those skilled in the art that certain features may be employed independently of others and that modifications and changes may be made without departing from the spirit and scope of the invention. Thus, features of the invention may be employed in conveyor systems of the suspended type, the control unit may be of a kind having a displaceable member, and chutes may be employed in place of roller-type storage paths. Also, it will be understood that the conveyor system may be provided with a number of safety devices which include photoelectric cells, for example, arranged at the article receiving ends of the storage paths to actuate a signal when the storage paths have received all the articles they can hold. Further, a return conveyor can be employed to return to the article receiving end of the receiving conveyor those articles which have not been transferred to the storage paths. I therefore do not wish to be limited to the embodiment shown in the drawing and described in the specification and aim in the following claims to cover all modifications and changes which fall within the true spirit and scope of the invention.

I claim:

1. In a conveyor system, a conveyor adapted to receive articles, means for driving the conveyor, means for stopping an article at a first zone of the conveyor, first mechanism for moving the stop means out of the path of movement of the article, a transfer device at a second zone of the conveyor to effect transfer of an article therefrom, second mechanism for actuating the transfer device, a control member for the second transfer device mechanism which is at the second zone and movable from a first inactive position to a second operable position responsive to an article at the second zone, control means for the conveyor system comprising a movable member having an endless surface, means for driving said surface in synchronism with the conveyor, a plurality of aligned elements in a single row which are fixed to the surface and project therefrom, first and second normally open electric switches which are spaced apart and have actuating members in the path of movement of the projecting elements for closing the switches, the interval of time it takes for a projecting element on the surface to move from the first switch to the second switch and the interval of time it takes for an atricle to move from the stop means to the control member to effect movement thereof to its second operable position being essentially the same, means responsive to closing of the first switch by one of the elements for actuating the first mechanism for moving the stop means out of the path of movement of the article, and means responsive both to the closing of the second switch by the one element and movement of the control member to its second operable position by the article moving from the stop means for rendering the second mechanism operable to actuate the transfer device to effect transfer of the article from the second zone of the conveyor.

2. In a conveyor system, a conveyor adapted to receive articles, means for driving the conveyor, means for stopping articles at a first zone of the conveyor, first mechanism for moving the stop means out of the path of movement of the articles, a plurality of transfer devices to effect transfer of articles from the conveyor at a number of transfer zones which are at different distances from the first zone, each of the transfer devices being actuated by a different second mechanism, each second mechanism having its own independent control member which is at a different one of the transfer zones and movable from a first inactive position to a second operable position responsive to an article at the transfer zone associated therewith, control means for the conveyor system comprising a movable member having an endless surface, means for driving said surface in synchronism with the conveyor, a plurality of elements which are fixed to the surface and project therefrom in a plurality of aligned rows corresponding to the number of transfer zones, a plurality of normally open first and second electric switches which are spaced apart and have actuating members in the path of movement of the projecting elements for closing the switches, each individual pair of first and second electric switches having the actuating members thereof in the path of movement of the projecting elements in a different one of the rows of elements, the interval of time it takes for each projecting element in a different one of the rows of elements to move from the first switch to the second switch coacting therewith and the interval of time it takes for articles to move from the stop means to a corresponding different one of the control members to move it to its second operable position being the same, the projecting elements being distributed on the surface whereby only one element at a time is operable to close a first switch by imparting movement to its actuating member, means responsive to closing of one of the first switches by an element in one of the rows of elements for actuating the first mechanism for moving the stop means out of the path of movement of an article, and means responsive both to the closing of one of the second switches by the element in the one row of elements and movement of the corresponding different control member to its second operable position by the article moving from the stop means for rendering the second mechanism associated with the control member in its second operable position to actuate the transfer device associated therewith to effect transfer of the article from one of the transfer zones of the conveyor.

3. A conveyor system as set forth in claim 2 in which each pair of first and second electric switches forms part of an electric circuit, each electric circuit being operatively associated with the first mechanism for moving the stop means out of the path of movement of an article and operatively associated with a different one of the second mechanisms to actuate the transfer device associated therewith, and switch means associated with said electric circuits for selectively transporting an article from the first zone at the stop means to any one of the transfer zones of the conveyor for transfer therefrom by the transfer device.

4. A conveyor system as set forth in claim 3 in which the switch means comprises a plurality of manually operable switches each of which is associated with a different one of the electric circuits.

5. A conveyor system as set forth in claim 3 in which the projecting elements in one of the rows of elements are spaced the same distance from one another whereby the articles moving past the stop means on the conveyor are uniformly spaced apart responsive to intermittent operation of the switch means after each article moves from the first zone past the stop means.

6. A conveyor system as set forth in claim 2 in which said first mechanism includes structure for rendering the stop means operable to stop an article at the first zone after being moved out of the path of movement of the articles, and mechanism for actuating the last-mentioned structure responsive to movement of an article on the conveyor from the first zone past the stop means.

7. A conveyor system as set forth in claim 2 in which the first switches are in alignment in a row perpendicular to the rows of elements and the second switches are in alignment in a row inclined to the rows of elements.

8. A conveyor system as set forth in claim 2 in which the first mechanism for moving the stop means out of the path of movement of the articles and each of the second mechanisms for actuating one of the transfer devices to transfer articles from the conveyor at the transfer zones comprises an air cylinder and means including a master control valve for controlling the supply of air thereto under pressure, a pilot air control system for regulating the master control valve of the first mechanism which includes a solenoid operated valve operatively associated with each of the first switches, a pilot air control system for regulating the master control valve of each second mechanism which includes a solenoid operated valve and another valve, each of the last-mentioned solenoid operated valves being operatively associated with a different one of the second switches and each of the other valves being operatively associated with a different one of the control members.

9. In a conveyor system, a main conveyor adapted to receive articles, means for driving the main conveyor, means for advancing the received articles intermittently on the main conveyor from a first zone, a plurality of lateral conveyors, a plurality of transfer devices to effect transfer of articles from the main conveyor to the lateral conveyors at a number of transfer zones which are at different distances from the first zone, independent means for operating each of said transfer means, each of said last-mentioned means having its own independent control member which is movable from a first inactive position to a second operable position responsive to an article at the vicinity of the transfer zone with which it is associated, and control means for selectively transporting an article from the first zone to any one of the lateral conveyors, said control means comprising a movable member defining an endless exterior face, means for driving said face in synchronism with the main conveyor, a plurality of elements which are fixed to the exterior face and project therefrom in a plurality of aligned rows corresponding to the number of transfer zones, a plurality of first and second electric switches which are spaced apart and have operating members in the path of movement of the projecting elements for actuating the switches, each individual pair of first and second electric switches having the operating members thereof in the path of movement of the projecting elements in a different one of the rows of elements, the distance between the first and second switches coacting with a different row of elements corresponding to the distance between the first zone and a different one of the transfer zones on the main conveyor, the elements being distributed on the exterior face whereby only one element at a time is operable to actuate a first switch by imparting movement to its operating member, mechanism responsive to actuation of one of the first switches by an element in one of the rows of elements for rendering said advancing means operable to advance an article on the conveyor from the first zone, and means responsive both to the actuation of one of the second switches by the element in the one row of elements and movement of the corresponding independent control member to its second operable position by the article advancing from the first zone for rendering the operating means associated with the control member in its second operable position to operate the transfer device associated therewith for transferring the article from one of the transfer zones to the lateral conveyor associated therewith.

10. A conveyor system as set forth in claim 9 in which said control means forms part of an electrical operating system for selecting at will which pair of first and second electric switches becomes operable to effect transportation of an article from the first zone to any of the lateral conveyors.

11. A conveyor system as set forth in claim 9 in which the first switches comprise microswitches which are in alignment in a single row perpendicular to the rows of elements and the second switches comprise microswitches which are in alignment in a single row inclined at an acute angle to the rows of elements.

12. A conveyor system as set forth in claim 9 in which each one of the transfer means moves from an inactive position to an active position to transfer an article from one of the transfer zones to the lateral conveyor associated therewith and the independent means for operating each of the transfer means includes structure for returning the transfer means from its active position to its inactive position, and mechanism for actuating the last-mentioned structure responsive to movement imparted to an article by the transfer means when it is moved to its active position.

13. A conveyor system as set forth in claim 12 in which the independent means for operating each of said transfer means to move it from an inactive position to an active position and the structure for returning it from the active position to the inactive position comprises an air cylinder and means including a master control valve for controlling the supply of air thereto under pressure from a source of supply, a pilot air control system for regulating the master control valve which includes a solenoid operated valve and second and third valves, each of the solenoid operated valves being operatively associated with a different one of the second switches, each of the second valves being operatively associated with a different one of the control members, and each of the third valves being operatively associated with a different one of the mechanisms responsive to movement imparted to an article by the transfer means when it is moved to its active position.

References Cited in the file of this patent

UNITED STATES PATENTS

| | | |
|---|---|---|
| 1,231,027 | Johnson | June 26, 1917 |
| 1,362,034 | Olson | Dec. 14, 1920 |
| 1,868,894 | Glahn | July 26, 1932 |
| 2,182,902 | Nye | Dec. 12, 1939 |
| 2,728,466 | Postlewaite | Dec. 27, 1955 |
| 2,977,003 | Muller | Mar. 28, 1961 |
| 3,011,621 | Byrnes | Dec. 5, 1961 |
| 3,034,665 | Speaker | May 15, 1962 |
| 3,044,638 | Bruce | July 17, 1962 |